(12) United States Patent
Lapierre

(10) Patent No.: US 11,499,587 B1
(45) Date of Patent: Nov. 15, 2022

(54) SAFETY ATTACHMENT FOR A BOLT SNAP TO PREVENT UNINTENTIONAL OPENING

(71) Applicant: Blu Rock Enterprises LLC, Cranston, RI (US)

(72) Inventor: Kerri Lena Lapierre, Cranston, RI (US)

(73) Assignee: Blu Rock Enterprises LLC, Cranston, RI (US)

( * ) Notice: Subject to any disclaimer, the term of this patent is extended or adjusted under 35 U.S.C. 154(b) by 0 days.

(21) Appl. No.: 17/351,838

(22) Filed: Jun. 18, 2021

Related U.S. Application Data

(60) Provisional application No. 63/044,745, filed on Jun. 26, 2020.

(51) Int. Cl.
*F16B 45/04* (2006.01)
*F16B 45/00* (2006.01)

(52) U.S. Cl.
CPC .......... *F16B 45/045* (2021.05); *F16B 45/002* (2021.05); *F16B 45/049* (2021.05)

(58) Field of Classification Search
CPC .... F16B 45/045; F16B 45/002; F16B 45/049; A01K 27/005
See application file for complete search history.

(56) References Cited

U.S. PATENT DOCUMENTS

| | | |
|---|---|---|
| 311,941 A | 2/1885 | Armstrong |
| 393,138 A | 11/1888 | Blazier |
| 680,800 A | 8/1901 | Munchmeyer |
| 686,258 A | 11/1901 | Buzard et al. |
| 759,805 A | 5/1904 | Broga |
| 979,641 A | 12/1910 | Brash |
| 1,583,326 A | 5/1926 | Waller |
| 1,598,684 A | 9/1926 | Jensen |
| 4,689,860 A | 9/1987 | Suchowski |
| 7,526,843 B2 * | 5/2009 | Lin .................. F16B 45/04 24/600.2 |
| 8,590,120 B2 | 11/2013 | Sakai |

(Continued)

FOREIGN PATENT DOCUMENTS

| | | | |
|---|---|---|---|
| EP | 1483958 A1 * | 12/2004 | .......... A01K 27/004 |
| EP | 3020272 A1 | 5/2016 | |

(Continued)

*Primary Examiner* — Robert Sandy
*Assistant Examiner* — Louis A Mercado
(74) *Attorney, Agent, or Firm* — Cesari and McKenna, LLP; James A. Blanchette

(57) ABSTRACT

In one embodiment, a safety attachment for a bolt snap (e.g., a swivel bolt snap) is provided that prevents unintentional opening of a bolt action gate. The safety attachment includes a body with an integral top ring, an integral bottom ring, and a hollow center cavity. The body may have a convex outer surface that extends beyond a release button of the bolt action gate. The integral top ring may contact the release button. The integral bottom ring may prevent movement of the safety attachment along a shaft of the bolt snap. The hollow center cavity may accommodate the shaft of the bolt snap. The body and its integral top ring and bottom ring may be constructed of a durable, flexible, elastic material that can, in response to pressure on the release button, permit motion of the release button and bolt action gate while increasing the force required.

20 Claims, 16 Drawing Sheets

(56) References Cited

U.S. PATENT DOCUMENTS

| | | |
|---|---|---|
| D813,652 S | 3/2018 | Deveraux |
| 10,058,075 B2 | 8/2018 | Nakata et al. |
| 10,383,462 B2 | 8/2019 | Arakawa |
| 2003/0070267 A1 | 4/2003 | Kung |
| 2007/0261210 A1 | 11/2007 | Chen |
| 2012/0311830 A1* | 12/2012 | Schlipper ................ F16B 45/04 |
| | | 24/600.4 |
| 2015/0226254 A1 | 8/2015 | Nonoguchi et al. |
| 2019/0211868 A1 | 7/2019 | Zivanovic et al. |

FOREIGN PATENT DOCUMENTS

| | | |
|---|---|---|
| GB | 2213862 A | 8/1989 |
| JP | 2014147393 A | 8/2014 |
| WO | WO-2011/135739 A1 | 11/2011 |
| WO | WO-2019/092484 A1 | 5/2019 |

\* cited by examiner

SAFETY ATTACHMENT FOR A BOLT SNAP TO PREVENT UNINTENTIONAL OPENING

CROSS-REFERENCE TO RELATED APPLICATIONS

The present application claims the benefit of U.S. Provisional Patent Application Ser. No. 63/044,745, which was filed on Jun. 26, 2020, by Kerri Lapierre for a "Safety Attachment to Prevent the Involuntary Opening of a Swivel Bolt Snap", which is hereby incorporated by reference in its entirety.

BACKGROUND

Technical Field

The present disclosure relates to mechanical fasteners, and more specifically to bolt snaps, for example, swivel bolt snaps.

Background Information

A bolt snap is a type of manually-operated mechanical fastener used to connect items. The most common form of bolt snap is a single-ended swivel bolt snap (or simply a "swivel bolt snap"). Referring to FIG. 1, a swivel bolt snap 100 typically includes a hook 110 at one end with the opening 120 of the hook in line with a hollow shaft 130 of the swivel bolt snap, and flanges 140, 150 and a pin (not visible in FIG. 1) at the other end coupled to a swivel fitting, such as a swivel eye 160. The tip 112 of the hook 110 of the swivel bolt snap 100 is most often in line with the central axis of the hollow shaft 130. A bolt-action gate 170 is usually slidably fitted into the hollow shaft 130, and arranged to contact with the tip 112 when closed. The bolt-action gate 170 typically has a short rounded tab (a "release button") 180 on its side, which may be pressed by a finger (typically the thumb) of a user to open the bolt-action gate 170, to allow the hook 110 to be connected to an item. Usually, there is a compression coil spring (not visible in FIG. 1) in the hollow shaft 130 between the bolt-action gate 170 and a bottom portion of the hollow shaft, which will return the bolt-action gate 170 to rest against the tip 112 when the button 180 is released.

Bolt snaps, including swivel bolt snaps 100, come in a variety of sizes. Such sizes are often demarcated by their opening width (i.e. the maximum distance between the tip 112 of the hook 110 and the bolt-action gate 170), their usable length (i.e. the maximum length between an inside face of the hook 110 and an inside face of the swivel eye 160 measured parallel the major axis of the swivel bolt snap) and an inside width (i.e. a maximum width between the opposing inside faces of the swivel eye 160 measured perpendicular to the major axis of the swivel bolt snap). A very common size bolt snap (often referred to a "1-inch swivel bolt snap") has an opening width of approximately 3/8 inches (in) (9.525 millimeters (mm)), a usable length of approximately 3 3/16 in (80.9625 mm) and an inside width of approximately 1 in (25.4 mm). Other bolt snaps have other dimensions.

Bolt snaps, including swivel bolt snaps 100, are used in many applications. One common application is in animal (e.g., dog) leashes, where the hook 170 is connected to the animal's collar. Other applications include luggage, marine/scuba diving and general household applications. Bolt snaps have been commercially available for nearly 100 years and are still extremely popular, despite many newer mechanical fasteners coming to the market. One reason bolt snaps are still so popular is that they can be quickly and easily operated single-handedly. Another reason is that they are easy to manufacture and thereby can be sold at low prices. However, despite this popularity, bolt snaps are also known to have a significant flaw.

Bolt snaps, including swivel bolt snaps 100, are prone to accidental, unintentional opening. The compression coil spring used to return the bolt-action gate 170 to rest against the tip 112 of the hook 170 is typically quite weak. Further, the spring is prone to degrade (wear-out) or break over time (e.g., due to fatigue, corrosion, etc.). A weak spring may allow the bolt-action gate 170 to open by simple centripetal forces. For example, when used in an animal (e.g., dog) leash, centripetal forces generated by the animal shaking its head can be sufficient to overcome the week spring and open the bolt-action gate 170. Likewise, the weak spring may allow the bolt-action gate to open if the release button makes incidental contact with an object in the environment. For example, when used in an animal (e.g., dog) leash, the animal may rub up against objects (e.g., dog clothing), and if the release button is "bumped" the bolt-action gate may open. A broken spring (e.g., due to fatigue, corrosion, etc.) may allow the bolt-action gate to open under innumerable circumstances, as the bolt-action gate 170 may easily slide back and forth with minimal resistance.

There have been many attempts over the years to address this flaw in bolt snaps (e.g., swivel bolt snaps 100). Some attempts have been made to change the design of the bolt snap, adding additional latches, mechanism, appendages and the like. However, these alternative designs for bolt snaps have failed to achieve commercial success. One reason is that they typically destroy the quick, single-handed operation that has led bolt snaps to be so popular. The user is forced to fumble with the additional latches, mechanism, appendages, etc. each time they desire to open the bolt-action gate 170. Further, alternative designs typically make manufacturing of bolt snaps more difficult, requiring changes to machine tooling, and thereby increasing prices. Other attempts to address this flaw in bolt snaps have involved attaching fixtures to prevent opening. Such fixtures typically must be removed to allow the bolt-action gate 170 to travel. However, these fixtures, like redesigned bolt snaps, have failed to achieve commercial success. Similar to redesigned bolt snaps, these fixtures typically destroy the quick, single-handed operation that has led bolt snaps to be so popular. The user must take extra actions (often involving two hands) to remove the fixture each time they desire to open the bolt-action gate 170. Further, some of the fixtures have been over-complicated, involving multiple pieces, such that they cannot be easily manufactured and sold at low prices. Likewise, some of the fixtures have been effective only against one type of unintentional opening (e.g., effective only against centripetal forces and not incidental contact with an object in the environment, or vice-versa). Accordingly, many users continue to use traditional bolt snaps despite their inherent flaw. This creates the potential for adverse consequences (e.g., animals coming unleashed and possibly lost, objects coming free and possibly falling and breaking, etc.).

It would be desirable to have a simple, easy to manufacture device that could prevent unintentional opening of a bolt action gate 170 of a swivel-bolt snap thereby improving safety, that also did not destroy the key features that have led to the popularity of bolt snaps in the first place. However, despite the long need, such a device has proved elusive.

SUMMARY

In example embodiments, a safety attachment for a bolt snap (e.g., a swivel bolt snap) is provided that prevents unintentional opening of the bolt action gate. The safety attachment is easily retrofittable on a traditional bolt snap (e.g., a swivel bolt snap) without modifying the bolt snap itself. It maintains the quick, single-handed operation that has been key to the longstanding popularity of bolt snaps. The safety attachment, once installed, may be kept in place while the user presses the release button and opens the bolt-action gate, avoiding the need for removal actions and other complications. Further, it is a single component, that may be manufactured at low cost.

In one example embodiment, a safety attachment for a bolt snap (e.g., a swivel bolt snap) that prevents unintentional opening of the bolt action gate is constructed to include a body with an integral top ring, an integral bottom ring, a hollow center cavity and a pair of integral finger tabs. The body may have a convex (e.g., substantially barrel-shaped) outer surface that may be configured to, when the safety attachment is fitted on the bolt snap, extend beyond the release button of the bolt action gate, providing protection from incidental contact with objects in the environment. The integral top ring may be configured to, when the safety attachment is fitted on the bolt snap, contact the release button of the bolt action gate. The integral bottom ring may be configured to, when the safety attachment is fitted on the bolt snap, contact a portion of the bolt snap (e.g., the flange and/or the swivel eye in the case of a swivel bolt snap) to prevent movement of the safety attachment along the shaft of the bolt snap. The hollow center cavity may have a substantially cylindrical shape and may be configured to, when the safety attachment is fitted on the bolt snap, accommodate a shaft of the bolt snap. One or more ribs integral to the body may extend into the hollow, substantially cylindrical center cavity, and may be configured to, when the safety attachment is fitted on the bolt snap, contact the shaft. The integral finger tabs may extend from the bottom ring and be configured to be grasped, to permit stretching of the body over the hook of the bolt snap, to fit the safety attachment onto the bolt snap. The integral finger tabs may include ridges or other grip-promoting features. The body, and its integral top ring, bottom ring and finger tabs, may be constructed from a durable, flexible, elastic material such that, when the safety attachment is fitted on the bolt snap, it can deform in response to pressure on the release button, to permit motion of the release button and bolt action gate, while increasing the force required to move them. This increased resistance may serve to prevent unintentional opening (e.g., in response to centripetal forces). The flexible, elastic material may be a thermoplastic elastomer (TPE), a silicone, a urethane or another type of material (e.g., that has a durometer hardness between 20 and 40 Shore A, preferably about 30 Shore A).

It should be understood that a variety of additional features and alternative embodiments may be implemented other than those discussed in this Summary. Likewise a variety of additional advantages may be achieved other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which.

DETAILED DESCRIPTION OF EXAMPLE EMBODIMENTS

Figure 7:
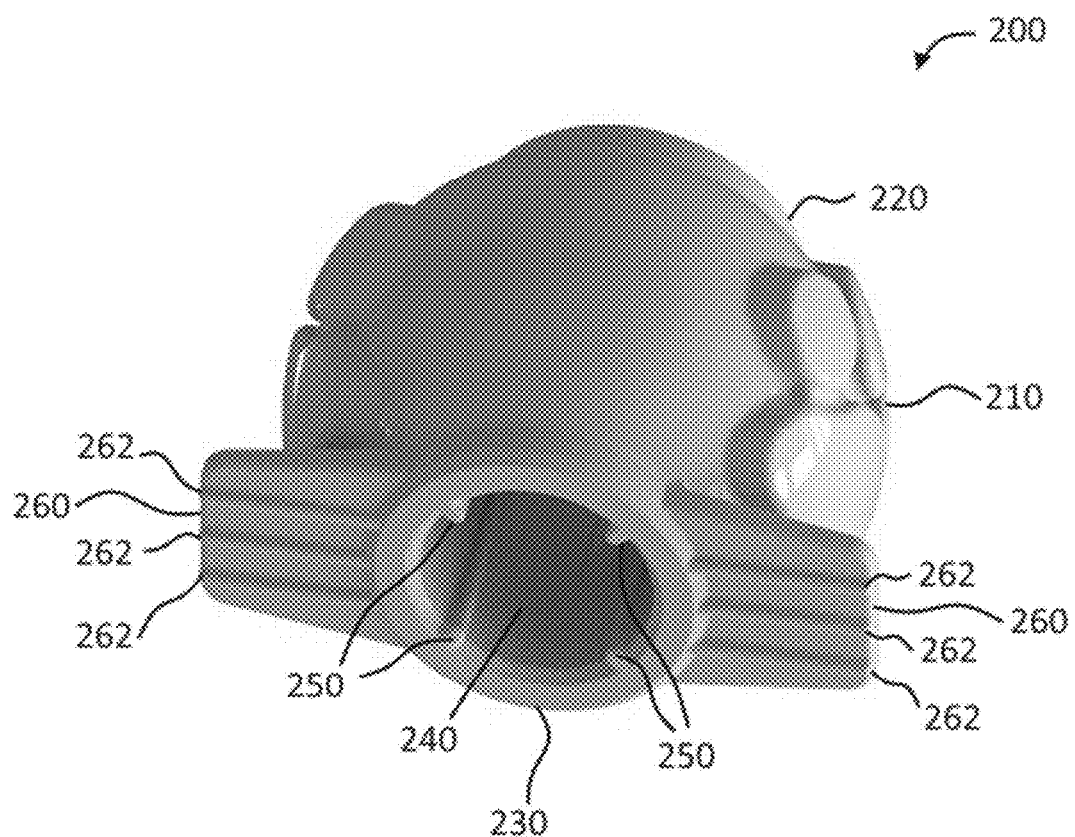
FIG. 7 is a perspective view of the example safety attachment of FIG. 2 from a second, different perspective.
Figure 8:
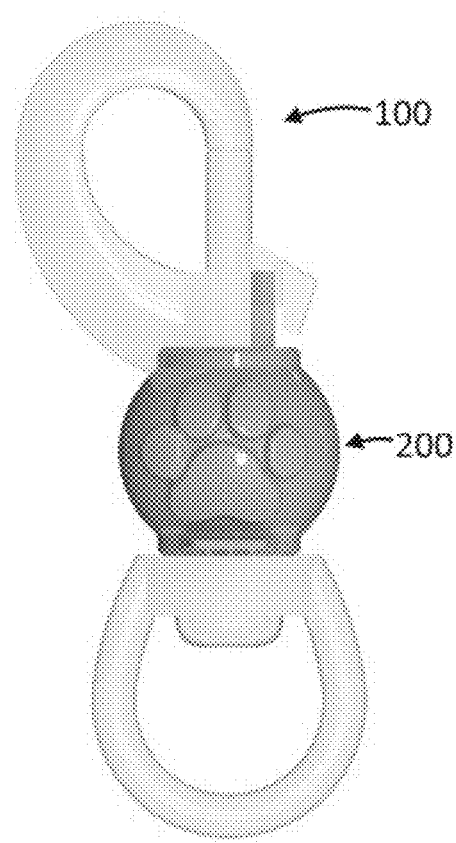
FIG. 8 is a front view of the safety attachment of FIG. 2 fitted on the swivel bolt snap of FIG. 1.
Figure 9:
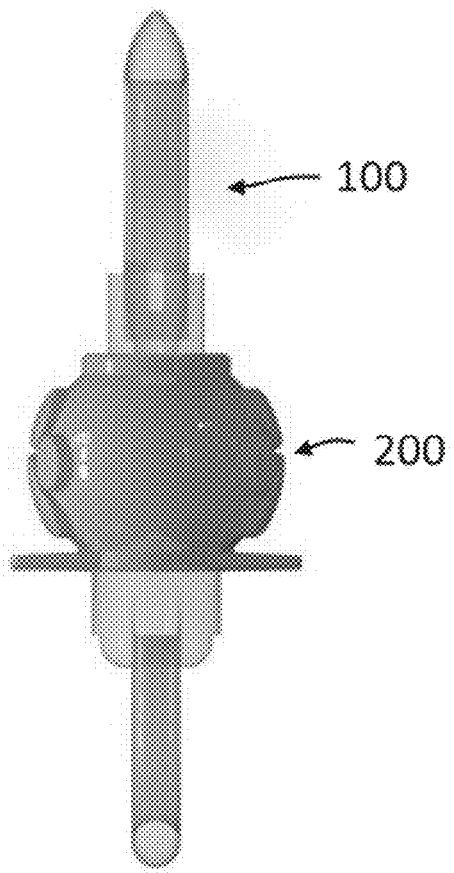
FIG. 9 is a side view of the example safety attachment of FIG. 2 fitted on the swivel bolt snap of FIG. 1.
Figure 10:
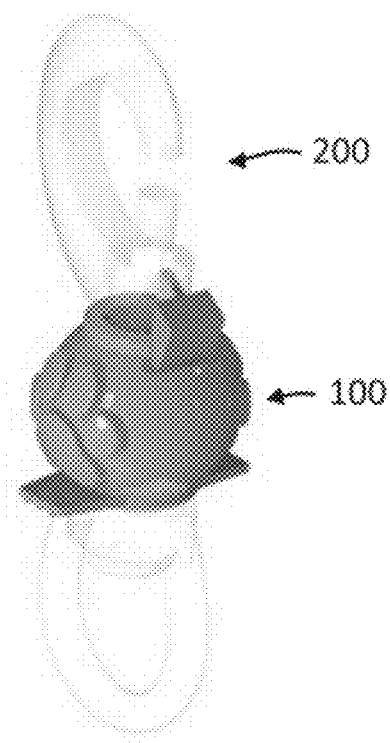
FIG. 10 is a perspective view of the example safety attachment of FIG. 2 fitted on the swivel bolt snap of FIG. 1.
Figure 11:
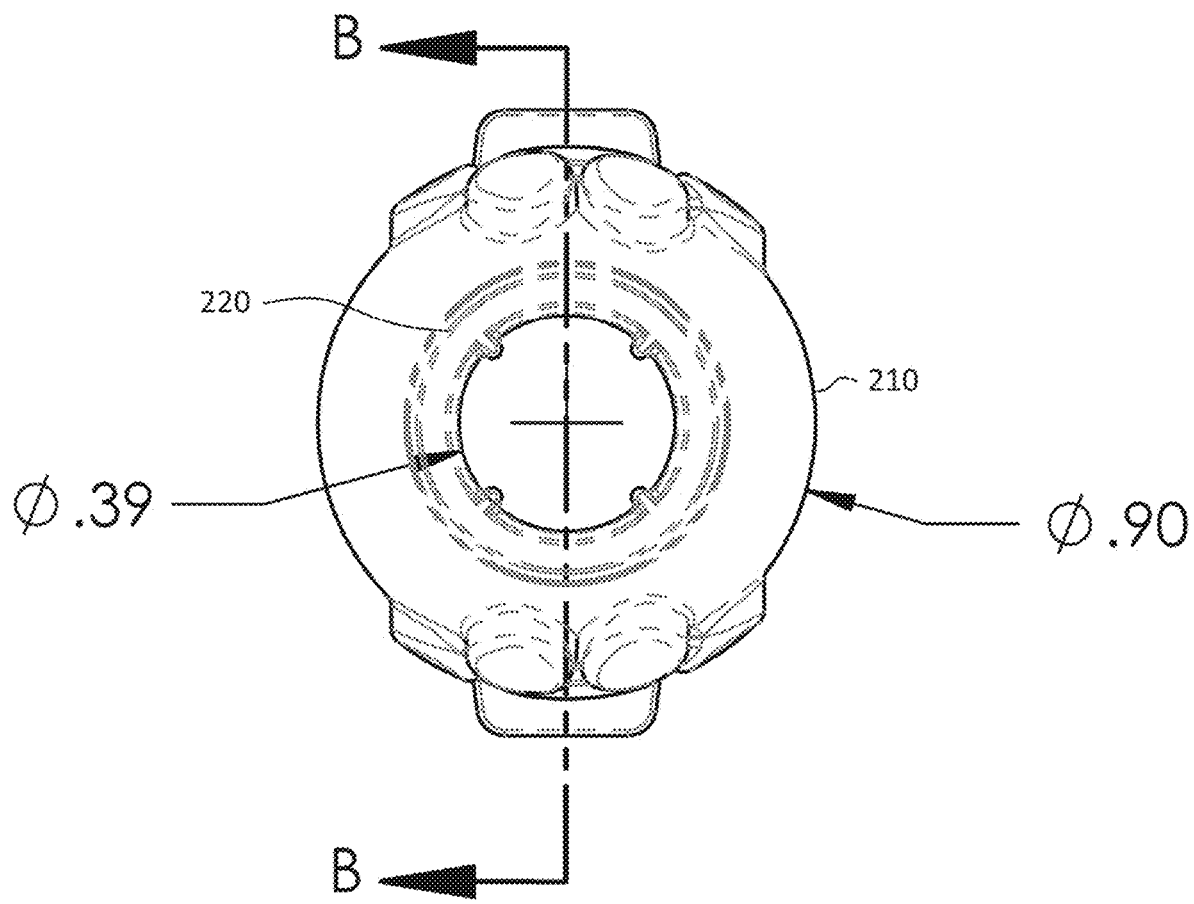
FIG. 11 is a top view of an orthographic drawing of the example safety attachment of FIG. 2.
Figure 12:
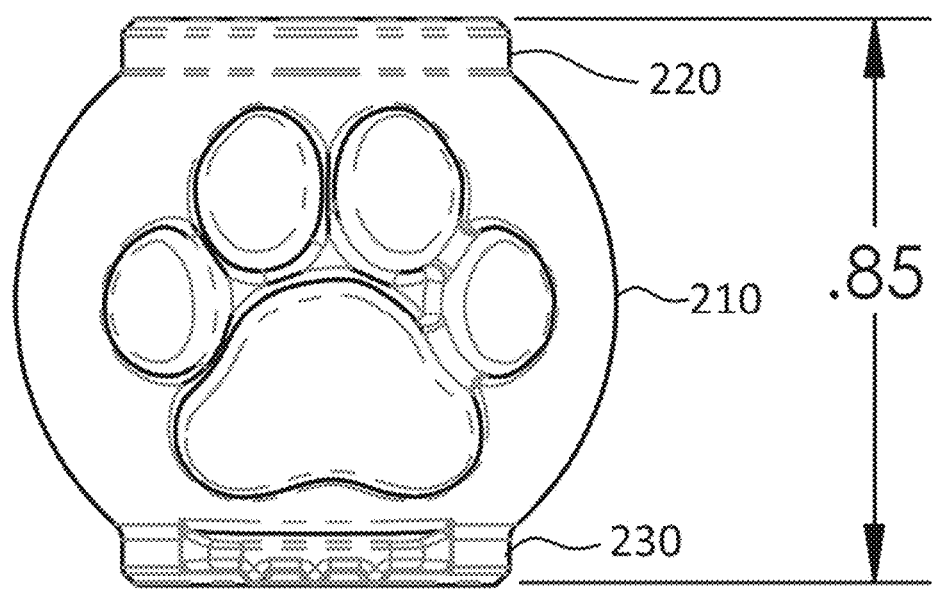
FIG. 12 is a first side view of an orthographic drawing of the example safety attachment of FIG. 2.
Figure 13:
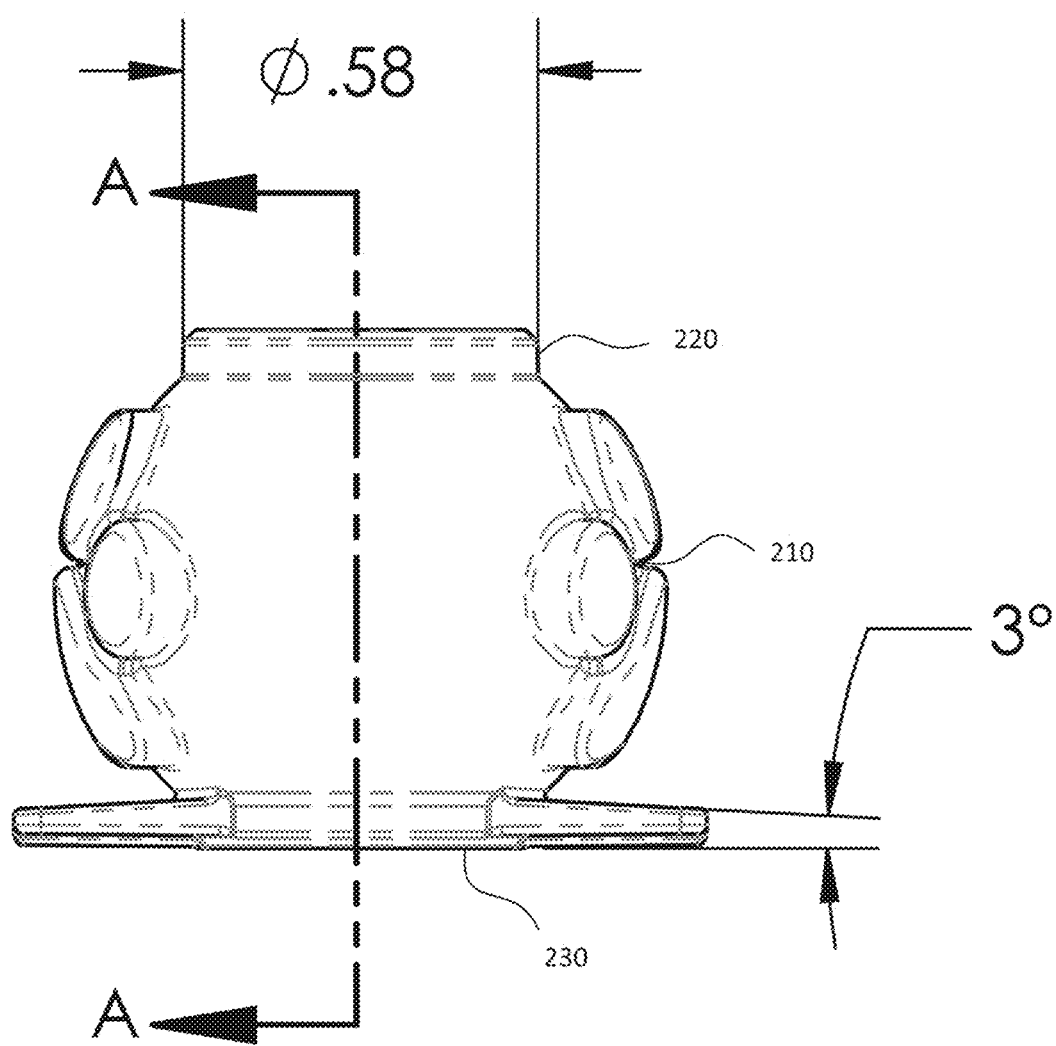
FIG. 13 is a second side view of an orthographic drawing of the safety attachment of FIG. 2.
Figure 14:
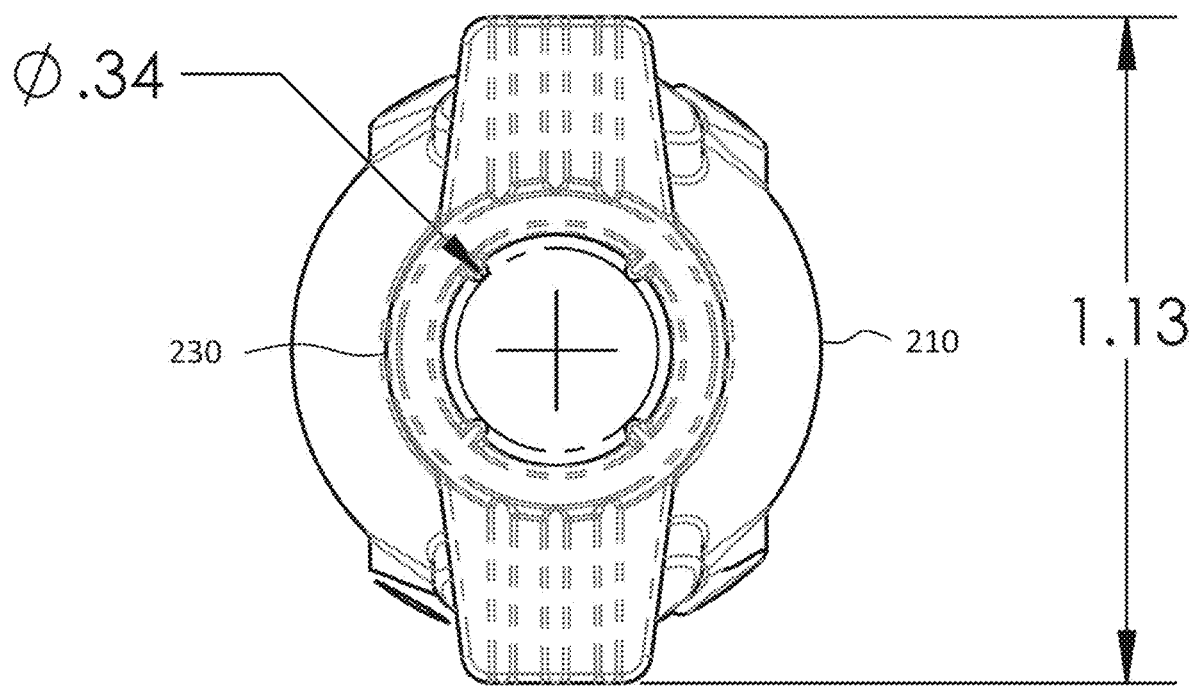
FIG. 14 is a bottom view of an orthographic drawing of the example safety attachment of FIG. 2.
Figure 15:
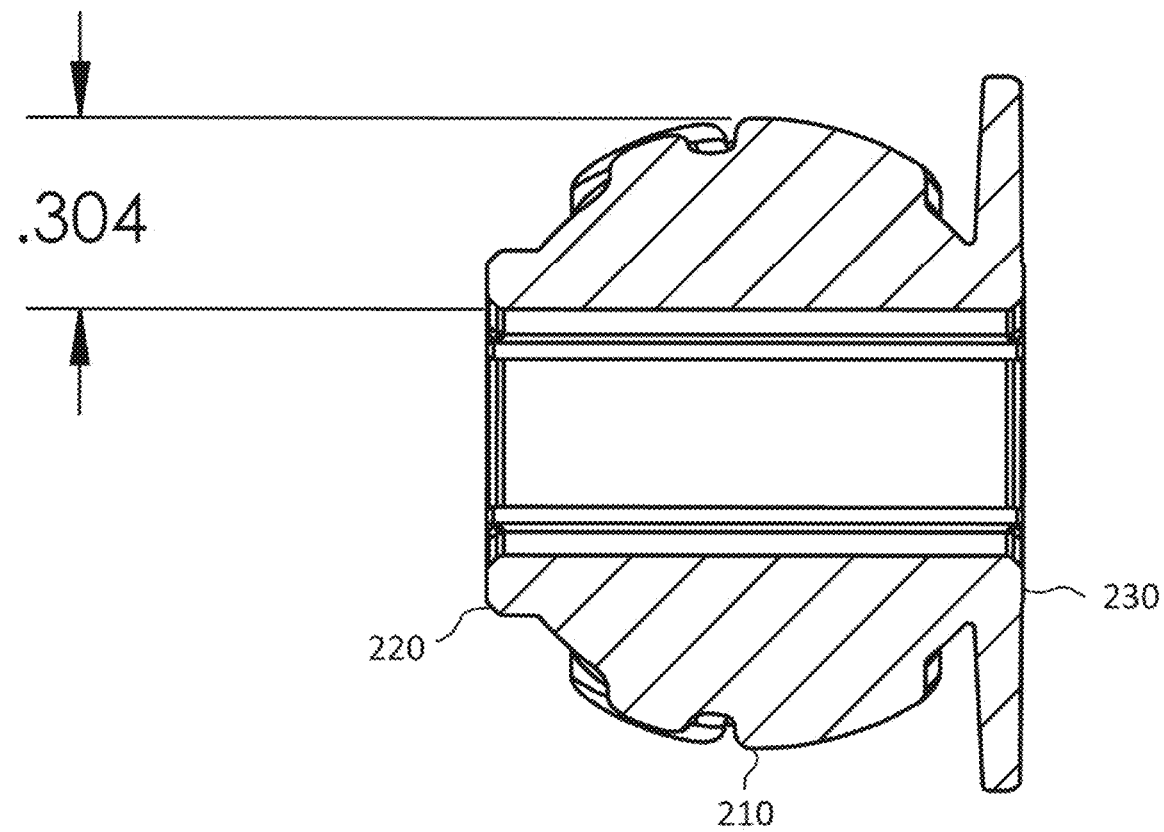
FIG. 15 is a first cross-section of an orthographic drawing of the example safety attachment of FIG. 2.
Figure 16:
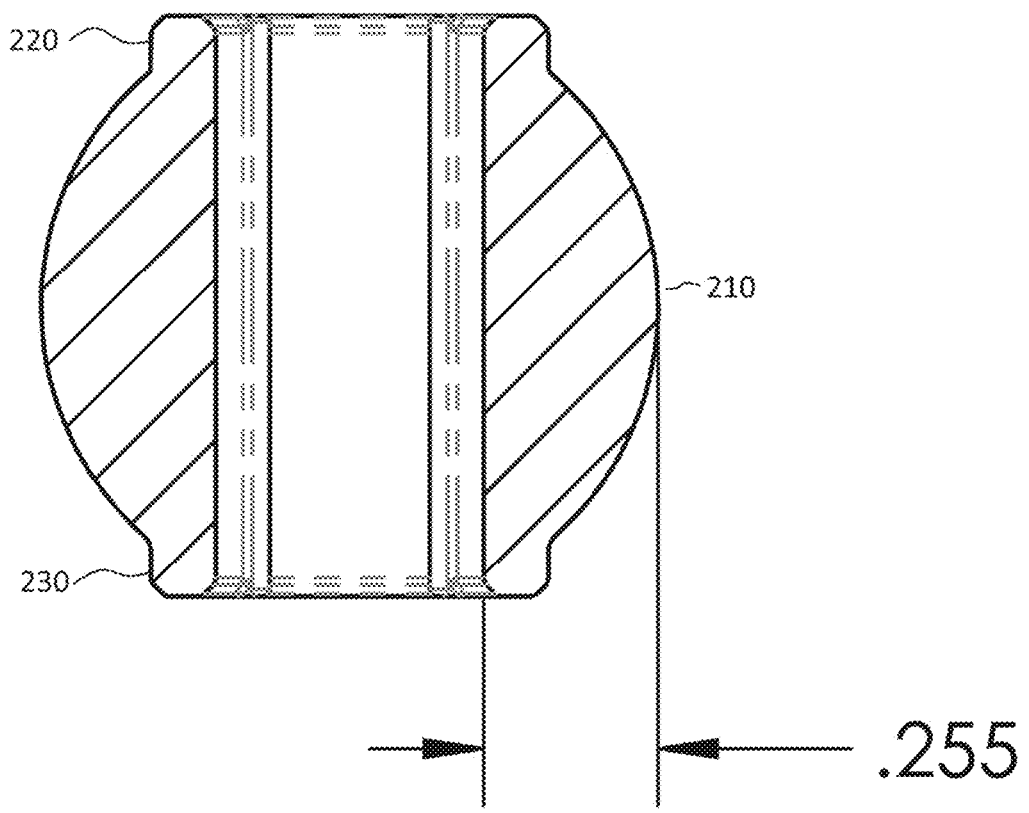
FIG. 16 is a second cross-section of an orthographic drawing of the example safety attachment of FIG. 2.

Referring to FIGS. 2-10, an example safety attachment 200 for a bolt snap (e.g., a swivel bolt snap 100) that prevents unintentional opening of a bolt action gate 170 includes a body 210. The body 210 may have a convex (e.g., substantially barrel-shaped) outer surface. Alternatively, the body may have an outer surface that has a variety of other shapes, for instance, that is flat (e.g., substantially cylindrically-shaped), concave (e.g., substantially concave-roller shaped), includes concave and convex portions, or that includes various out shapes or combinations of shapes. As can be seen in FIGS. 8 and 10, the outer surface of the body 210 may, when the safety attachment is fitted on the bolt snap, extend beyond the release button 180 of the bolt action gate 170, such that it is positioned to first contact objects in the environment, and protect the release button 180 from incidental contact with such objects. A custom design may be molded into body or printed on the body (e.g., in any of a variety of colors).

The body 210 may include an integral top ring 220 (e.g., that extends a small distance above the barrel-shaped portion). As can be seen in FIGS. 8 and 10, the integral top ring 220 may, when the safety attachment is fitted on a bolt snap (e.g., a swivel bolt snap 100), contact the release button 180 of the bolt action gate 170. As discussed below, through this contact between the integral top ring 220 and the release button 180, the safety attachment 200 may increase force required to move the release button 180 and thereby the bolt action gate 170. This added resistance (beyond what may be provided by the weak or broken compression coil spring) may prevent unintentional opening (e.g., in response to centripetal forces).

The body 210 may also include an integral bottom ring 230 (e.g., that extends a small distance below the barrel-shaped portion). As can be seen in FIGS. 8-10, the integral bottom ring 230 may, when the safety attachment is fitted on a bolt snap (e.g., a swivel bolt snap 100), contact a portion of the bolt snap, such as the flange 140 and/or the swivel eye 150 (in the case of a swivel bolt snap 100), to prevent movement of the safety attachment 200 along the shaft 130.

The body 210 may also include a hollow, substantially cylindrical center cavity 240 that extends along the major axis of the safety attachment 200 (e.g., inside the barrel-shaped portion). As can be seen in FIGS. 4-7 and 8-10, the hollow, substantially cylindrical center cavity 240 may, when the safety attachment is fitted on the bolt snap (e.g., swivel bolt snap 100), accommodate the shaft 130 of the bolt snap. In some embodiments, one or more ribs 250 integral to the body 210 may extend into the hollow, substantially cylindrical center cavity 240 to, when the safety attachment is fitted on a bolt snap (e.g., a swivel bolt snap 100), contact the shaft 130 of the bolt snap. The ribs 250 may improve fit of the body 210 to the shaft 130.

Figure 1:
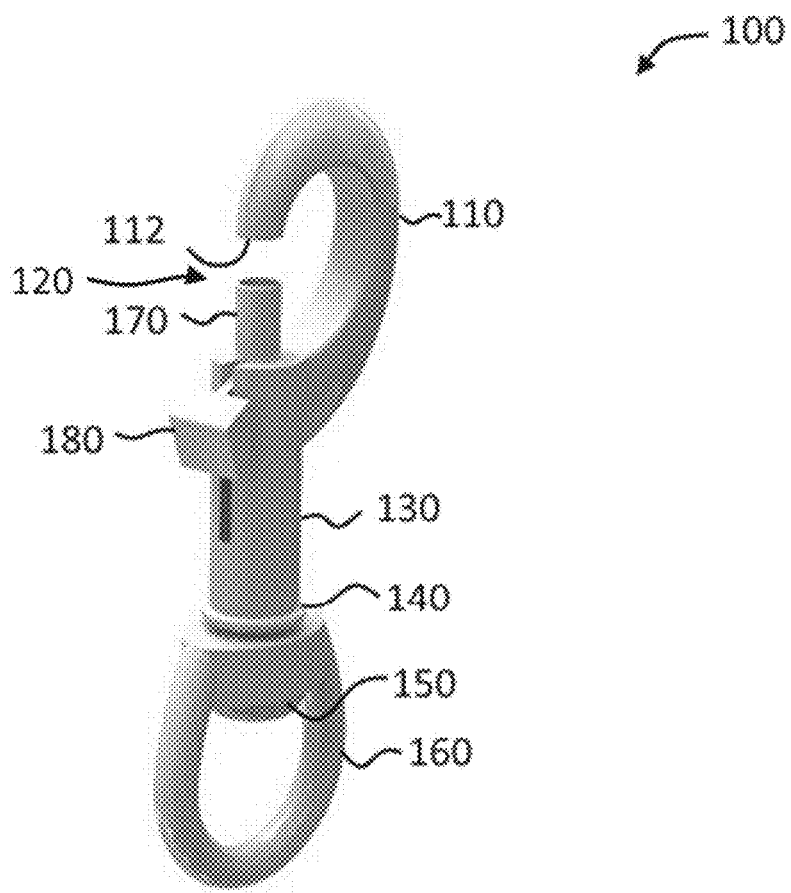
FIG. 1 is a perspective view of an example swivel bolt snap.
Figure 2:
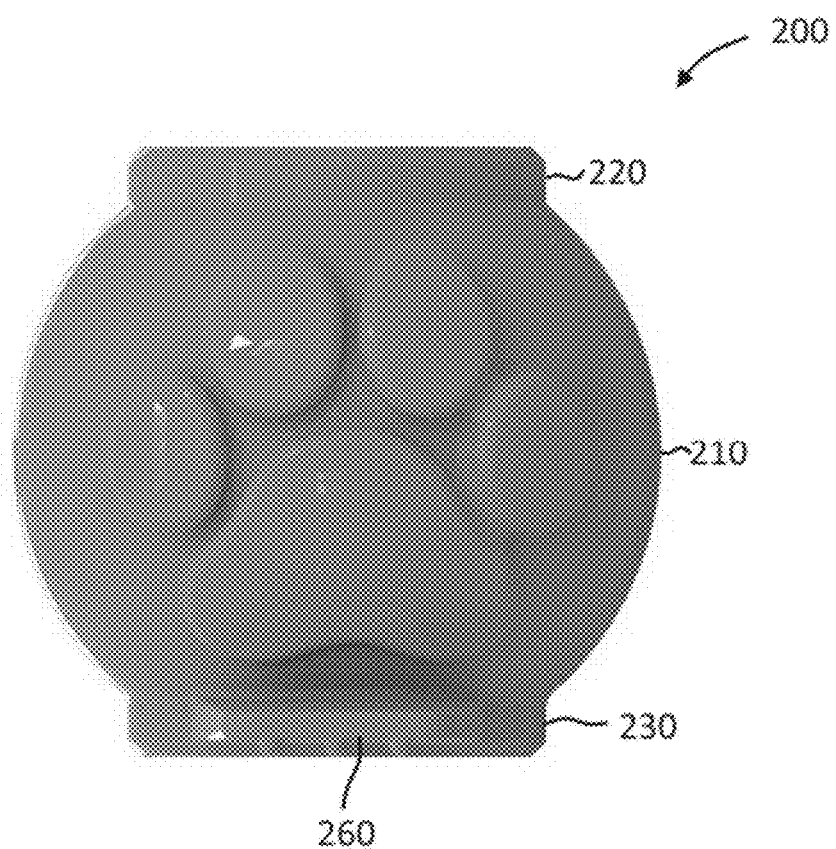
FIG. 2 is a front view of an example safety attachment for a bolt snap (e.g., a swivel bolt snap) that may prevent unintentional opening.
Figure 3:
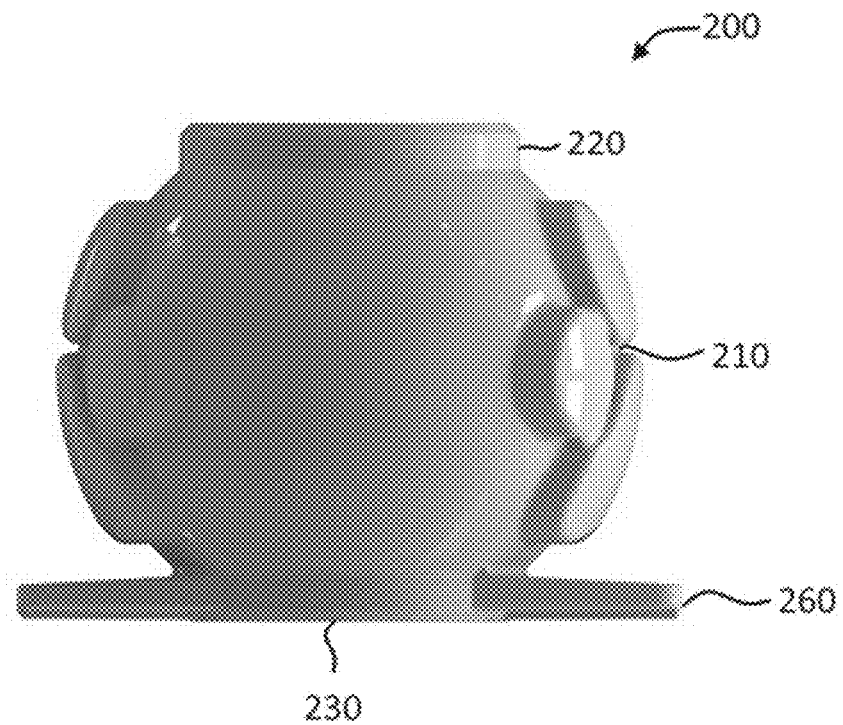
FIG. 3 is a side view of the example safety attachment of FIG. 2.
Figure 4:
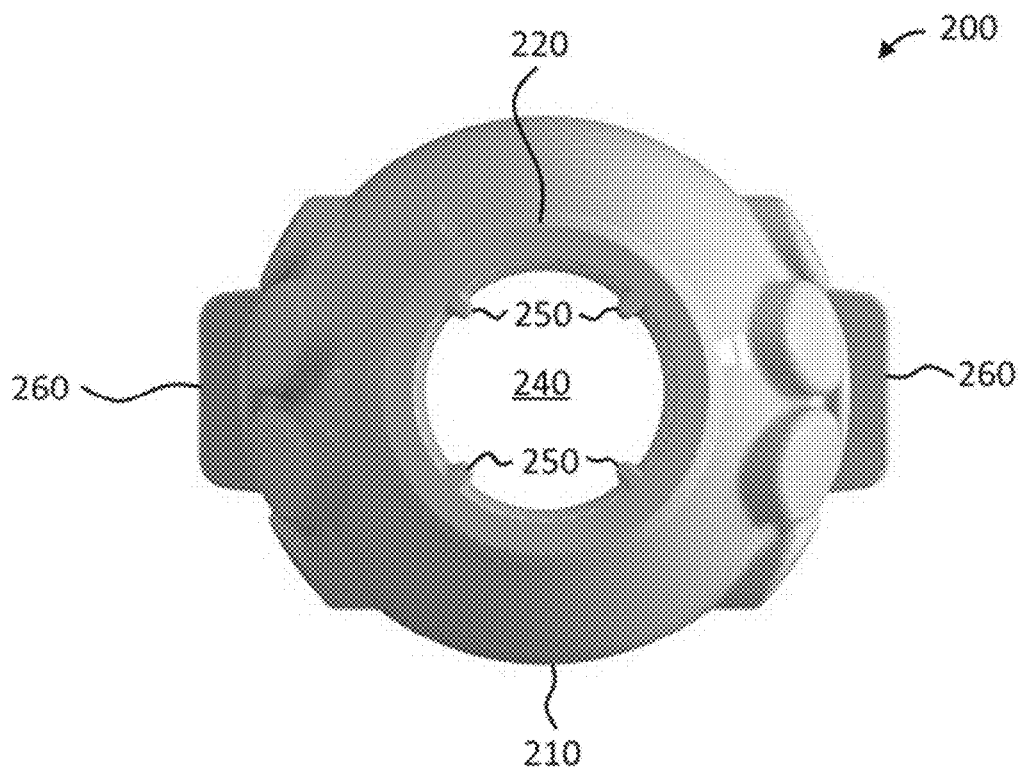
FIG. 4 is a top view of the example safety attachment of FIG. 2.
Figure 5:
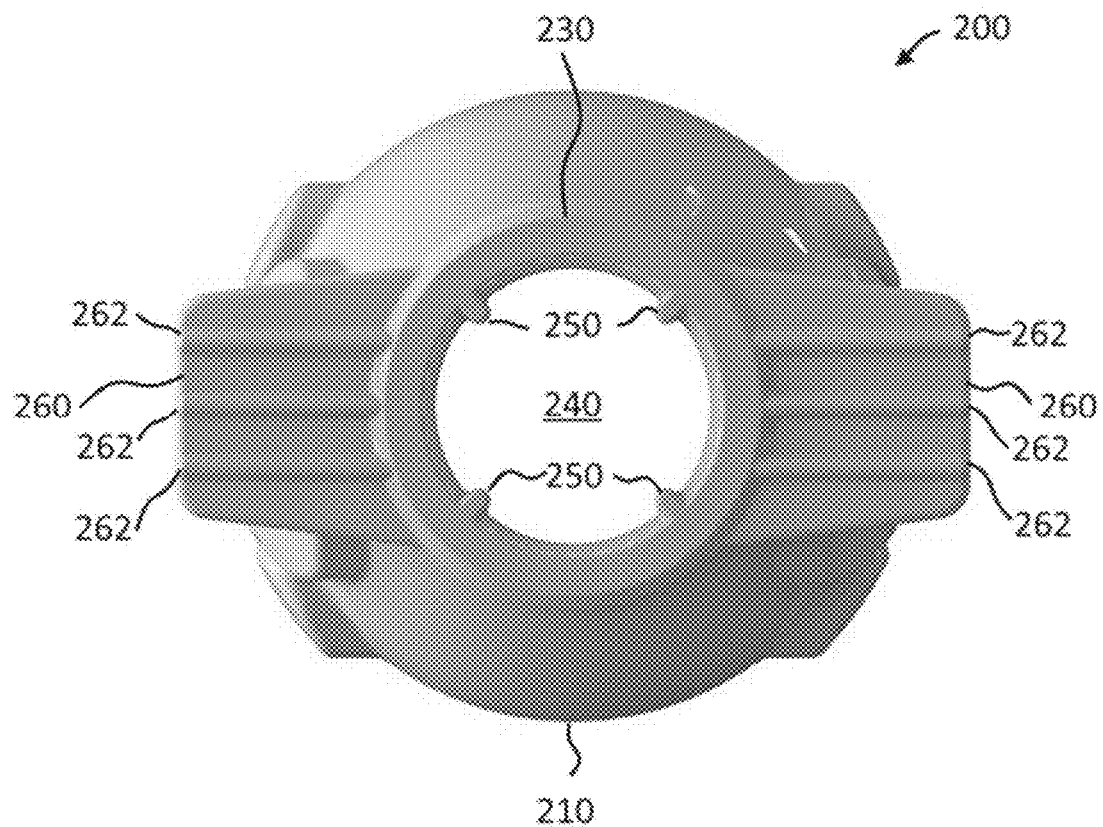
FIG. 5 is a bottom view of the example safety attachment of FIG. 2.
Figure 6:
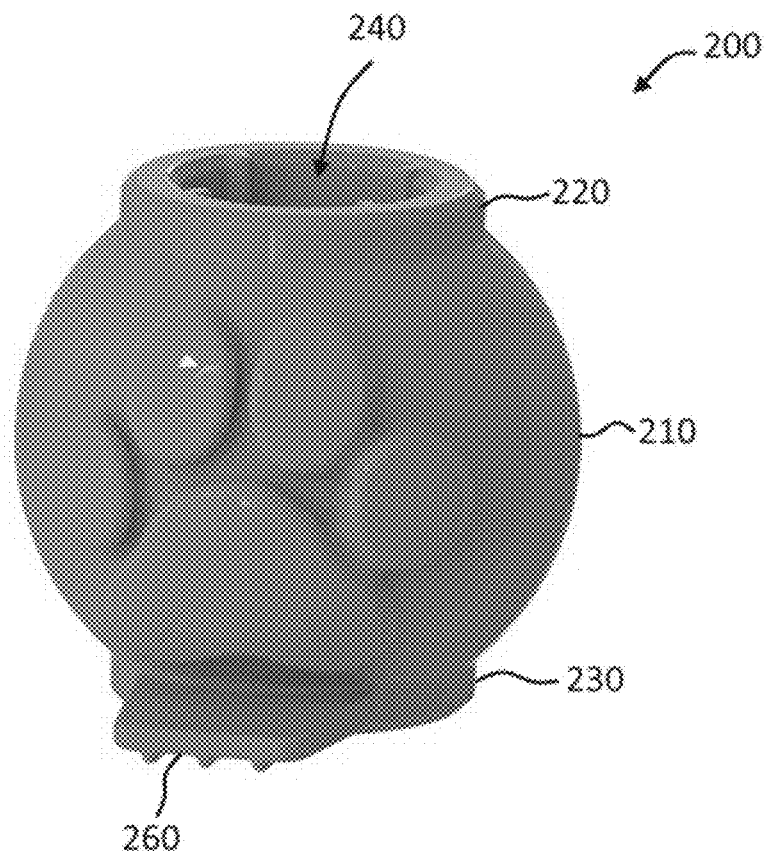
FIG. 6 is a perspective view of the example safety attachment of FIG. 2 from a first perspective.

A pair of integral finger tabs 260 may extend from the body 210, or more specifically the bottom ring 230 thereof. As can be seen in FIGS. 5 and 7, the finger tabs 260 may project axially with respect to the major axis of the safety attachment 200. The finger tabs 260 may include ridges or other grip promoting features, to enable them to be grasped by the user, and used to exert spreading force on the body 210 to stretch it over the hook 110, in order to retrofit the safety attachment 200 onto a bolt snap (e.g., a swivel bolt snap 100). The safety attachment 200 (i.e. the body 210 and its integral top ring 220, bottom ring 230 and finger tabs 260) may be constructed of a durable, flexible, elastic material. The durable, flexible, elastic material may be flexible enough to deform in response to pressure on the release button 180 by a user, to allow intended opening of the bolt action gate 170, while having sufficient rigidity such that the resistance it provides upon the release button 180 generally prevents unintentional opening of the bolt action gate 170. The durable, flexible, elastic material may be elastic enough to return to its original shape after deformation, and durable enough to withstand repeated deformations and environmental conditions. In some embodiments, the durable, flexible, elastic material may have a durometer hardness between 20 and 40 Shore A, preferably about 30 Shore A. However, other hardness may be desirable depending on parameters of the bolt snap (e.g., a swivel bolt snap 100) and the safety attachment 200 (such as the thickness of the body 210 and its shape), and the application in which it is being used (e.g., animal leash, luggage, marine/scuba diving, etc.). In some embodiments, the durable, flexible, elastic material may be a thermoplastic elastomer (TPE), such as the Dynaflex™ G7930-1001-00 thermoplastic elastomer. Alternatively, the durable, flexible, elastic material may be a silicone, a urethane, or another type of material. Depending on the bolt snap, and the application in which the bolt snap is being used (e.g., animal leash, luggage, marine/scuba diving, etc.) various material properties may be more important than others (e.g., durability vs. flexibility vs. elasticity, etc.), and materials may be chosen appropriately to provide these properties.

The safety attachment 200 may be constructed to have a variety of different dimensions. As discussed above, bolt snaps (e.g., swivel bolt snaps 100) typically come in a variety of sizes. The size of the safety attachment 200 may be adapted based on the size of the bolt snap (e.g., swivel bolt snap 100) to provide sufficient length (along its major axis) such that integral top ring 220 may contact the release button 180, while the integral bottom ring 230 may contact another portion of the bolt snap (such as the flange 140 and/or the swivel eye 150 in the case of a swivel bolt snap) to prevent movement along the shaft 130. Likewise, the outer diameter of the body (e.g., at its widest part) may be sized to provide sufficient diameter such that it extends beyond the release button 180 of the bolt action gate 170, to protect the release button 180 from incidental contact. Similarly, the hollow, substantially cylindrical center cavity 240 may be sized to have sufficient diameter to accommodate the shaft 130 of the bolt snap (e.g., swivel bolt snap 100). Referring to FIGS. 11-16, in some embodiments that may be adapted for use with a 1-inch swivel bolt snap, the body 210 (including the integral top ring 220 and bottom ring 230) may have a length along its major axis of between 19 millimeters (mm) and 24 mm (preferably, approximately 0.85 in (21.59 mm)) and a diameter at its widest part between 20 mm and 25 mm (preferably, approximately 0.9 in (22.86 mm)), and the hollow, substantially cylindrical center cavity 240 of the body may have a diameter between 7 mm and 12 mm (preferably, approximately 0.39 in (9.906 mm)). It should be understood that the safety attachment 200 may be readily adapted for use with bolt snaps of other sizes.

Operation of the safety attachment 200 may begin with retrofitting it to a bolt snap (e.g., a swivel bolt snap 100). This may be done by grasping the pair of tabs 260 and stretching the body 210 of the safety attachment 200 over the hook 110 of the bolt snap, to arrange the body such that the integral top ring 220 contacts the release button 180 of the bolt action gate 170, and the integral bottom ring 230 contacts another portion of the bolt snap (e.g., a flange 140 and/or swivel eye 160 in the case of a swivel bolt snap 100), and the shaft 130 is accommodated within the hollow, substantially cylindrical center cavity 240. The safety attachment 200 may be positioned in any manner axially around the shaft 130 (i.e. it is not position-dependent axially). Once installed, when a user desires to open the bolt action gate 170 of the bolt snap, they may do so in the traditional manner of placing pressure on the release button 180 (e.g., using a single handed grip). The body 210 of the safety attachment deforms in response to the pressure to permit the release button 180 to travel, and the bolt action gate 170 to open. When the pressure is removed from the release button 180, the bolt action gate 170 travels back to its original position, and the body 210 elastically returns to its original shape. Should a user desire to remove the safety attachment 200 from the bolt snap, they may reverse the sequence of operations.

The safety attachment 200 may have numerous advantages over prior attempts to prevents unintentional opening of the bolt action gate 170. As mentioned above, the safety attachment is easily retrofittable to a bolt snap (e.g., swivel bolt snap 100), without modifying the bolt snap itself. It is a single component, that may be manufactured at low cost. It maintains the quick, single-handed operation that has been key to the longstanding popularity of bolt snaps. The safety attachment 200, once installed, may be kept in place while the user presses the release button 180 and opens the bolt-action gate 170, avoiding the need for removal actions and other complications. In addition, the safety attachment 200 may be more effective than prior attempts because it employs two mechanisms synergistically to prevent unintended opening: protecting the release button 180 from incidental contact and increasing the force required to open the bolt-action gate 170.

In summary, the above description details example embodiments of a safety attachment 200 for a bolt snap (e.g., a swivel bolt snap 100) that prevents unintentional opening of the bolt action gate 170. It should be understood that various adaptations and modifications may be made to what is described above, to suit various types of bolt snaps and applications in which they may be used. To this end, the safety attachment 200 may be constructed to have a variety of alternative shapes, may be made out of a variety of alternative materials, may be made in a variety of alternative sizes, may include additional or lack certain features, etc. While example embodiments are provided, they are meant to be taken only by way of example. The invention is not intended to be limited to the specific examples shown.

What is claimed is:

1. A safety attachment for a bolt snap to prevent unintentional opening of a bolt action gate of the bolt snap, comprising:
   a body having a convex outer surface;
   a top ring at a first end of the body, the top ring integral to the body and configured to, when the safety attachment is fitted on the bolt snap, contact a release button of the bolt action gate of the bolt snap;
   a bottom ring at a second end of the body, the bottom ring integral to the body and configured to, when the safety attachment is fitted on the bolt snap, contact a flange and/or a swivel eye of the bolt snap to prevent movement of the safety attachment; and
   a hollow, substantially cylindrical center cavity formed by an inner surface of the body, the hollow, substantially cylindrical center cavity having a uniform cross section between the top ring and the bottom ring and configured to, when the safety attachment is fitted on the bolt snap, accommodate a shaft of the bolt snap,
   wherein the body is constructed of a flexible, elastic material that, when the safety attachment is fitted on the bolt snap, deforms in response to pressure on the release button transferred to the body to permit motion of the release button.

2. The safety attachment for the bolt snap of claim 1, further comprising:
   a pair of finger tabs integral to the body configured to be grasped to permit stretching of the body over a hook of the bolt snap to fit the safety attachment on the bolt snap.

3. The safety attachment for the bolt snap of claim 2, wherein each of the finger tabs extend from the bottom ring.

4. The safety attachment for the bolt snap of claim 2, wherein each of the finger tabs includes a plurality of ridges.

5. The safety attachment for the bolt snap of claim 1, wherein the flexible, elastic material is a thermoplastic elastomer (TPE).

6. The safety attachment for the bolt snap of claim 1, wherein the flexible, elastic material is a silicone or a urethane.

7. The safety attachment for the bolt snap of claim 1, wherein the flexible, elastic material has a durometer hardness between 20 and 40 Shore A.

8. The safety attachment for the bolt snap of claim 1, further comprising:
   one or more ribs integral to the body that extend into the hollow substantially cylindrical center cavity of the body and are configured to contact the shaft of the bolt snap.

9. The safety attachment for the bolt snap of claim 1, wherein the body has a length along its major axis of between 19 millimeters (mm) and 24 mm and a diameter at its widest part between 20 mm and 25 mm, and the hollow, substantially cylindrical center cavity of the body has a diameter between 7 mm and 12 mm.

10. A safety attachment for a bolt snap to prevent unintentional opening of a bolt action gate of the bolt snap, comprising:
    a body whose outer surface is substantially barrel-shaped, and whose inner surface forms a substantially cylinder-shaped center cavity, the body configured to be fitted on the bolt snap;
    a top ring at a first end of the body, the top ring integral to the body contacts a release button of the bolt action gate;
    a bottom ring at a second end of the body, the bottom ring integral to the body contacts a flange or a swivel eye of the bolt snap; and
    wherein the body is constructed of a flexible, elastic material and a cross section of the substantially cylinder-shaped center cavity formed by the inner surface of the body is uniform between the top ring and the bottom ring.

11. The safety attachment for the bolt snap of claim 10, wherein the bolt snap is a swivel bolt snap.

12. The safety attachment for the bolt snap of claim 11, further comprising:
    a pair of finger tabs integral to the body extending therefrom.

13. The safety attachment for the bolt snap of claim 10, wherein the flexible, elastic material is a thermoplastic elastomer (TPE).

14. The safety attachment for the bolt snap of claim 10, wherein the flexible, elastic material is a silicone or a urethane.

15. The safety attachment for the bolt snap of claim 10, wherein the flexible, elastic material has a durometer hardness between 20 and 40 Shore A.

16. The safety attachment for the bolt snap of claim 10, further comprising:
    one or more ribs integral to the body that extend into a hollow substantially cylindrical center cavity of the body.

17. The safety attachment for the bolt snap of claim 10, wherein the body has a length along its major axis of between 19 millimeters (mm) and 24 mm and a diameter at its widest part between 20 mm and 25 mm, and a hollow, substantially cylindrical center cavity of the body has a diameter between 7 mm and 12 mm.

18. A method for using a safety attachment on the bolt snap that prevents unintentional opening of a bolt action gate of the bolt snap, comprising:
    stretching a body of the safety attachment whose outer surface is substantially barrel-shaped and whose inner surface defines a hollow, substantially cylindrical center cavity, over a hook of the bolt snap to arrange the body such that a top ring at a first end of the body and integral to the body contacts a release button of the bolt action gate, a bottom ring at a second end of the body and integral to the body contacts a flange or eye of the bolt snap, and a shaft of the bolt snap is accommodated within the hollow, substantially cylindrical center cavity of the body;

in response to pressure on the release button transferred to the body, deforming the body to permit the release button to travel and the bolt action gate of the bolt snap to open; and in response to removal of pressure on the release button, elastically returning the body to an original shape, wherein the body provides added resistance against travel of the release button and opening of the bolt action gate.

19. The method of claim 18, wherein the stretching comprises grasping and pulling a pair of finger tabs integral to the body to stretch the body over the hook of the bolt snap.

20. The method of claim 18, wherein, during the deforming of the body to permit the release button to travel, a contact between the bottom ring and the flange or eye of the bolt snap prevents movement of the safety attachment along the shaft of the bolt snap.

* * * * *